United States Patent [19]

Nagasawa et al.

[11] Patent Number: 4,723,283

[45] Date of Patent: Feb. 2, 1988

[54] DATA TRANSMISSION SYSTEM

[75] Inventors: Fumihiro Nagasawa; Kuniharu Onozuka, both of Kanagawa, Japan

[73] Assignee: Sony Corporation, Tokyo, Japan

[21] Appl. No.: 876,444

[22] Filed: Jun. 20, 1986

[30] Foreign Application Priority Data

Jun. 28, 1985 [JP] Japan .................. 60-141868

[51] Int. Cl.$^4$ ............... H04N 7/167; H04L 9/00; H04D 3/06

[52] U.S. Cl. .................. 380/20; 370/106; 375/116; 380/21; 380/24; 380/44; 380/45; 380/47; 380/48

[58] Field of Search ............ 370/106; 375/116; 380/20, 21, 24, 44, 45, 47, 48

[56] References Cited

U.S. PATENT DOCUMENTS

| | | | |
|---|---|---|---|
| 3,649,758 | 3/1972 | Clark | 375/116 |
| 3,770,897 | 11/1973 | Haussmann et al. | 370/106 |
| 4,322,576 | 3/1982 | Miller | 380/48 |
| 4,408,203 | 10/1983 | Campbell | 380/45 |
| 4,434,323 | 2/1984 | Levine et al. | 380/44 |
| 4,531,021 | 7/1985 | Bluestein et al. | 380/21 |

Primary Examiner—Stephen C. Buczinski
Attorney, Agent, or Firm—Lewis H. Eslinger; Alvin Sinderbrand

[57] ABSTRACT

This invention relates to a data transmission system in which information data is shuffled and the data service is received by those who paid the charges.

According to this data transmission system, a service data and a key code transmitted from a data base station are received by a decoder provided at the side of a subscriber, in which only when these data are decoded and the key code transmitted coincides with a key code at the receiving side, a particular data service transmitted from the data base station can be received by the subscriber.

In the data transmission system of the invention, a control data portion transmitted is shuffled by changing a shuffling pattern by a synchronizing code inserted as part of the control data portion and by arranging the code length of the control data portion to be variable so that the content of data can not be decoded easily.

6 Claims, 18 Drawing Figures

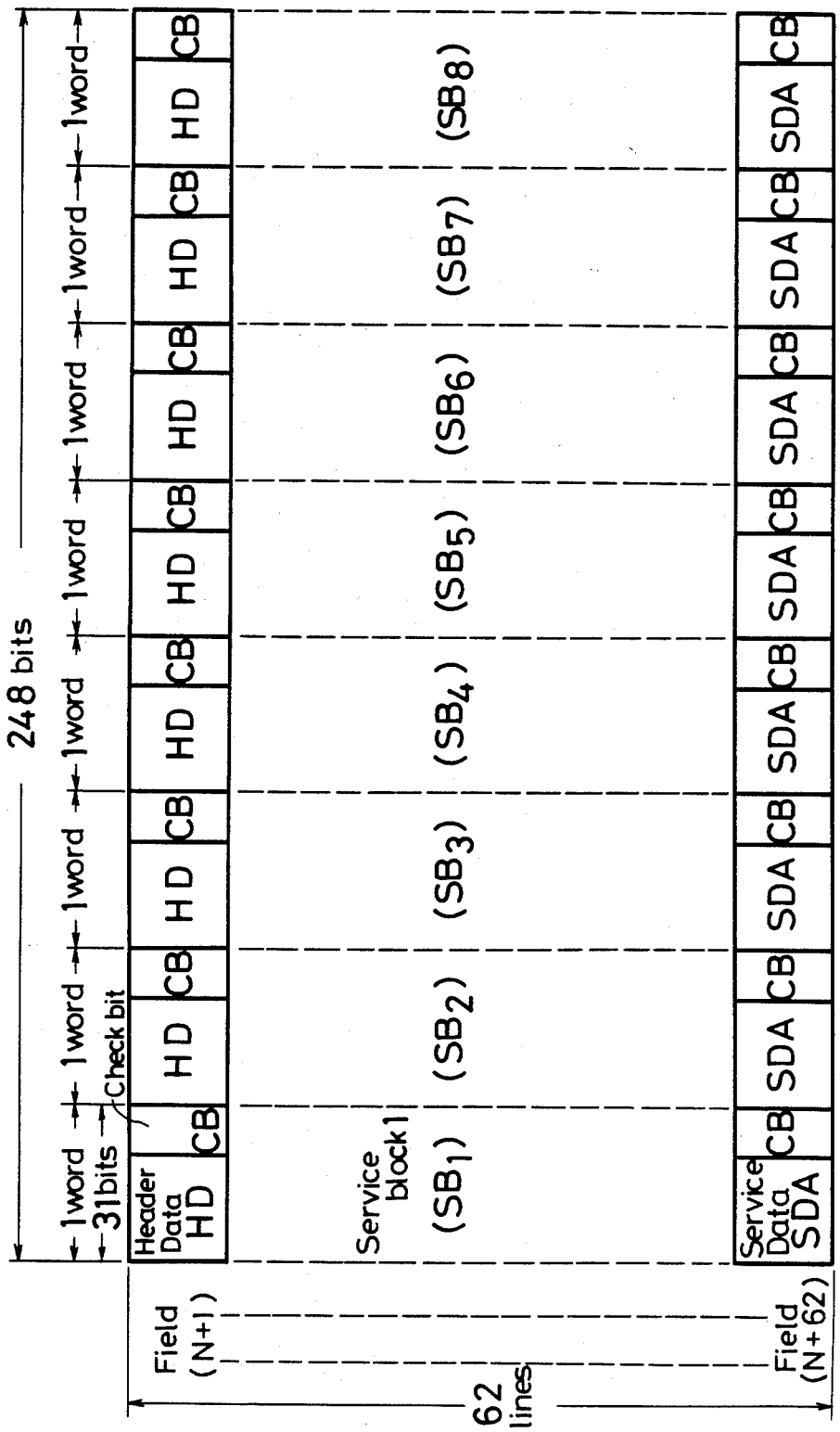

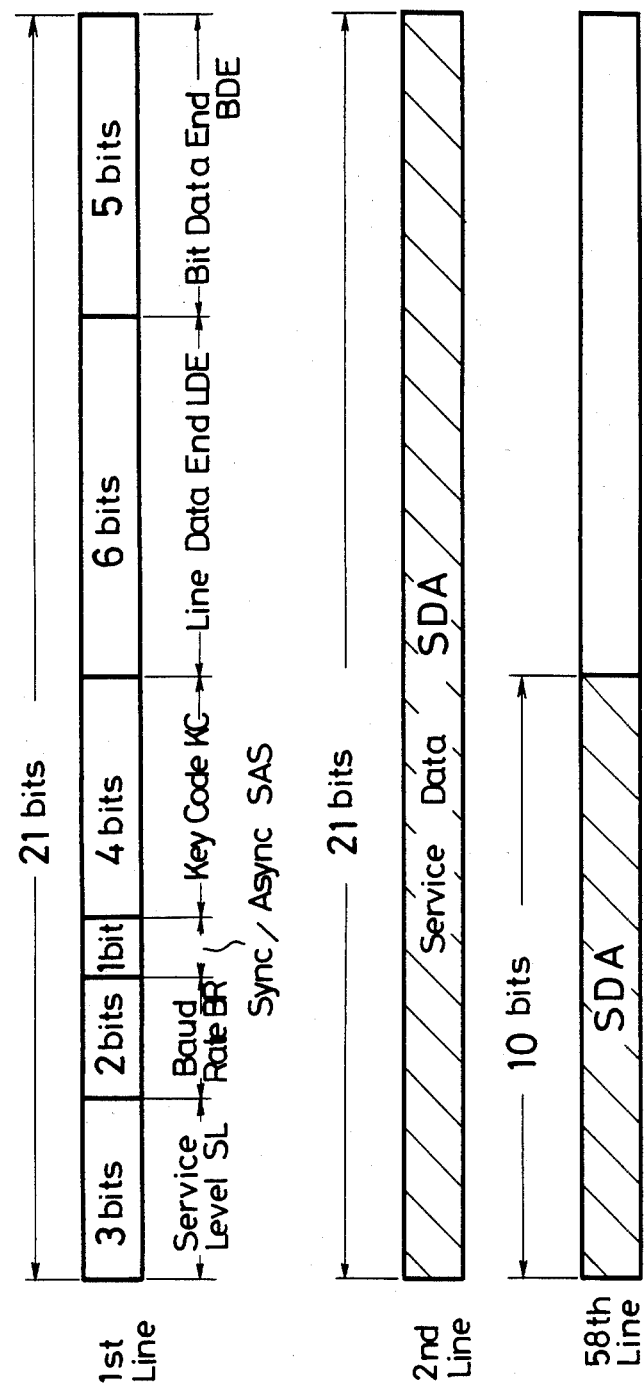

FIG. 5A
SB₁ — 9600 — SB₈
9600 bauds × 1

FIG. 5B
4800 | 4800
4800 bauds × 2

FIG. 5C
4800 | 2400 | 2400
4800 bauds × 1
2400 bauds × 2

FIG. 5D
SB₁ 1200|1200|1200|1200|1200|1200|1200|1200 SB₈
1200 bauds × 8

FIG. 6

Sync. Code SC (3 bytes)
Control Data CDA
48 bytes
CDA | CDA | CDA | CDA | CDA | Optional Data 28 bytes
1 byte
4 bytes
Dummy Code DC (4 to 11 bytes)
Sync. Code SC
1 block

DATA TRANSMISSION SYSTEM

BACKGROUND OF THE INVENTION

1. Field of the Invention

This invention relates generally to a novel data service or transmission system capable of shuffling an information data and by which an information or data service can be received by a pay system, and more particularly, is directed to a novel decoding means used in a data transmission system for decoding a control data portion the data length of which can be varied.

2. Description of the Prior Art

As a prior art data transmission system which can provide a particular information to only a particular subscriber, there is known one which uses a special network line.

To be more concrete, the particular information transmitted from the data base station by using a special network line is received by a decoder located at the side of a subscriber and the subscriber can receive the information at the station side.

By the way, the above mentioned data transmission system has such a defect that when the number of subscribers is increased considerably, it becomes difficult to secure the special network line.

When the information supplied by the station side are such as stock information, commodity exchange information in a plurality of markets and so on which require a lot of money to collect the information and supply it to the information transmitting facilities thereof, it is necessary to create a system that those who are not the subscribers can not decode the data with ease. Since according to the prior art data transmission system, the information can be easily obtained by the provision of a decoder at a subscriber, those who are not the subscriber can easily obtain the information.

Although in such case a highly-sophisticated wiretap preventing means must be provided, the prior art data transmission system does not employ any such means.

In the prior art, if the subscriber purchases the decoder once, so long as the subscriber holds such decoder, the subscriber can always receive the information. However, when the cost for collecting the information and the facility expenses for managing the station amount to a large sum, it is preferable that the information is supplied with a charge.

However, such data transmission system is not yet developed at present, in which a large number of subscribers are intended, the information can be shuffled with high secrecy and the information can be supplied with a charge.

OBJECTS AND SUMMARY OF THE INVENTION

Accordingly, it is an object of this invention to provide an improved data transmission system which can remove the defects encountered with a prior art data transmission system.

It is another object of this invention to provide an improved data transmission system which can shuffle data with high security and which can supply the information with charge.

It is further object of this invention to provide shuffling means for shuffling a data so that the data can not be deshuffled easily.

According to one aspect of this invention, there is provided a data transmitter used in a data transmission system and for transmitting service data to a user terminal, comprising:

(a) service data source for generating service data in BLOCKs,
(b) first shuffling means for shuffling said service data within one block according to a predetermined shuffling map;
(c) control data generating means for generating control data corresponding to each block of said service data, said control data having a data portion with a variable length and representing at least said predetermined shuffling map and a synchronizing code portion;
(d) second shuffling means for shuffling the data portion of said control data according to a predetermined shuffling pattern represented by said synchronizing code portion;
(e) mixing means for mixing said service data and said control data; and
(f) transmitting means for transmitting the output of said mixing means.

According to another aspect of the present invention, there is provided a data receiver used in a data transmission system, and for receiving data transmitted from a transmitter and having service data shuffled according to a predetermined shuffling map and a control data with a data portion of variable length and representing at least said predetermined shuffling map and a synchronizing code portion, the data portion of said control data being shuffled according to a predetermined shuffling pattern represented by said synchronizing code, said data receiver comprising:

(a) data separating means supplied with a received data and for separating said service data and said control data;
(b) synchronizing code detecting means supplied with said separated control data and for detecting the synchronizing code;
(c) deshuffle pattern generating means supplied with the output of said synchronizing code detecting means and for generating a deshuffle pattern corresponding to said predetermined shuffling pattern;
(d) first deshuffling means supplied with said separated control data and said deshuffle pattern, and for deshuffling the data portion of said control data;
(e) deshuffling map generating means supplied with the output of said first deshuffling means and for generating a deshuffling map corresponding to said predetermined shuffling map; and
(f) second deshuffling means supplied with said separated service data and said deshuffling map and for deshuffling said service data.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 3 is a schematic representation showing a format of a service data portion;

FIG. 4 is a diagram showing a relationship between a service data portion and a header data portion;

FIG. 5 is a diagram showing a relationship between a baud rate and a service block;

FIG. 6 is a schematic representation showing one example of a format of a control data portion;

DESCRIPTION OF THE PREFERRED EMBODIMENT

Now, one embodiment of a data transmission system according to the present invention will hereinafter be described with reference to the attached drawings.

Figure 1:
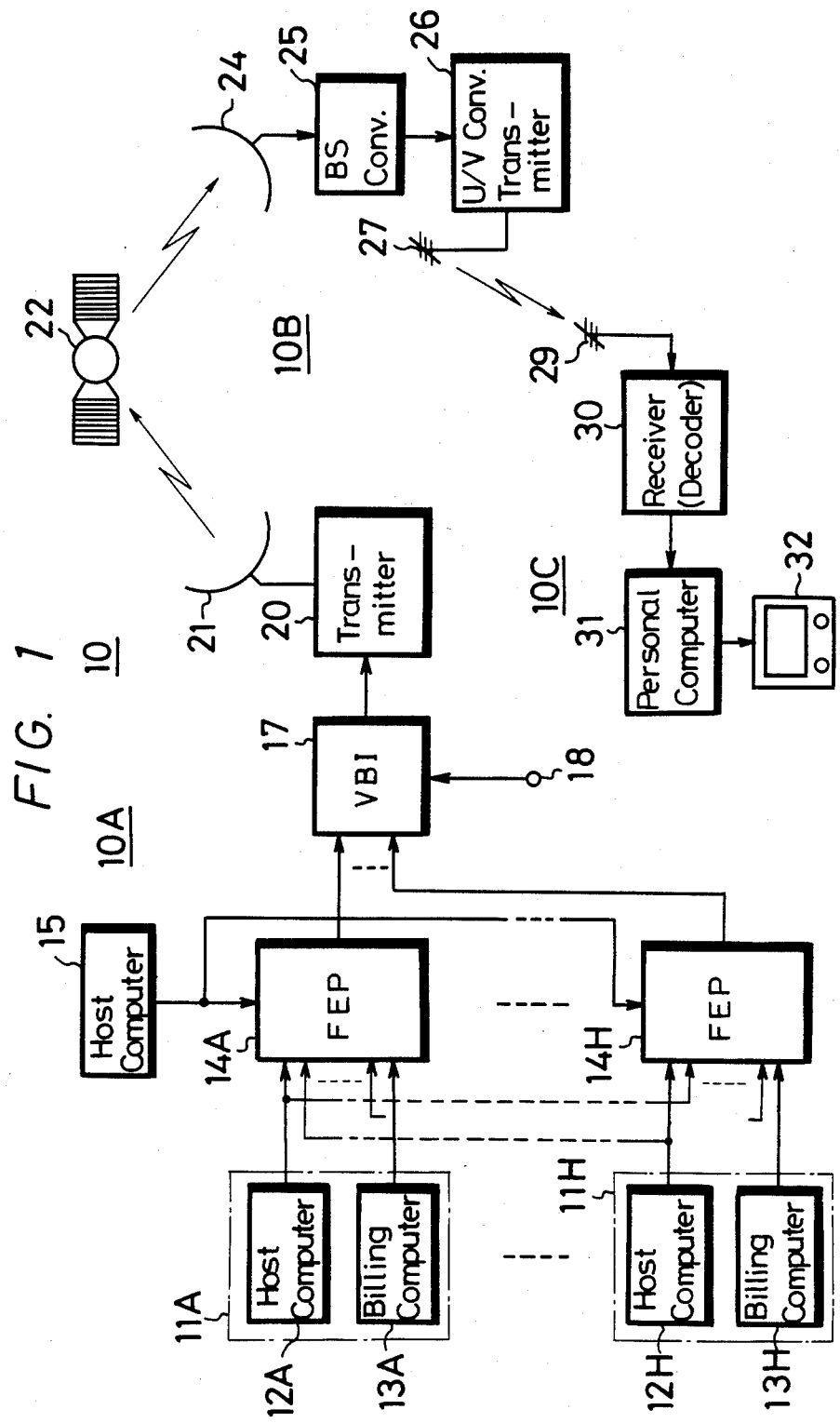
FIG. 1 is a systematic block diagram showing an outline of an embodiment of a data transmission system according to this invention.

FIG. 1 is a schematic diagram showing an example of a data service or transmission system which is the premise of this invention. Before describing this data transmission system, an outline of a data transmission system according to this invention will be described.

According to this data transmission system, the service data and the key code transmitted from the data base station are received by a decoder provided at the side of a subscriber. Only when the data transmitted is decoded and then the key code thereof becomes coincident with a key code at the receiving side can the particular information or data service transmitted from the data base station be received by the receiving side.

The first feature thereof is that the transmitted data is shuffled so as to prevent the wire-tapping.

The reason for this is that as described before the data can not be received by those who are not the subscribers without difficulty and the data can be received by only the particular subscribers.

The second feature is that the data service is made available with charge.

In other words, only those who pay the charges can receive the data service.

To this end, according to this system, the reception contract period, for example, the monthly reception contract period is determined and, by the renewal of the contract period, the subscriber can receive the data continuously.

Whether or not the charge is paid at every reception contract period is checked at the service station side. If the charge is not paid, in order that the service of data can be stopped automatically, the addressing at the decoder side which will be described later is carried out by similar means to the data transmission.

Accordingly, after the addressing, at the same time as the above mentioned data transmission, the key code is transmitted. Only when the key code transmitted coincides with a key code (key code stored by the addressing) stored in the memory of the decoder at the reception side can the data be received by the reception side.

FIG. 1 is a block diagram showing one example of a novel data transmission system 10 which becomes the premise of this invention.

Figure 2:
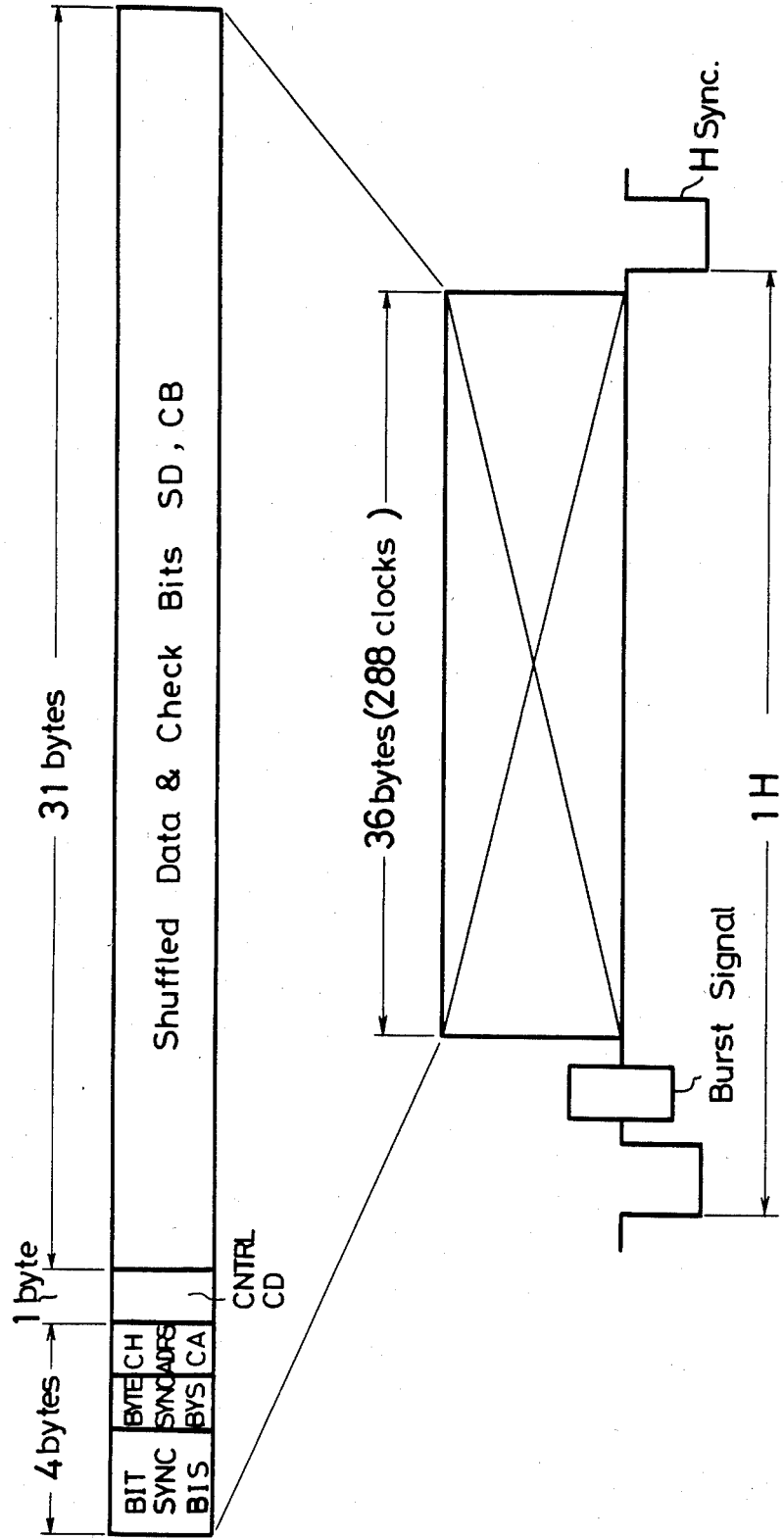
FIG. 2 is a schematic representation showing a format of a transmission signal.

In FIG. 1, reference numeral 10A designates a data base station, 10B designates a ground relay station and 10C designates a reception station (subscribed station). The transmission signal formed by the data base station 10A is inserted into a predetermined one horizontal line or several horizontal lines in a vertical blanking period of a broadcast signal. The broadcast signal inserted with the transmission signal (FIG. 2 shows the format thereof) is transmitted to a broadcast satellite 22, while this broadcast signal is transmitted from the broadcast satellite 22 to the relay station 10B.

The relay station 10B includes a BS antenna 24. A broadcast signal of an SHF band received by the BS antenna 24 is supplied through a BS converter 25 to a transmitter 26 in which the broadcast signal is converted to a broadcast signal of a UHF band or a VHF band which is suitable for the re-transmission. Also, this converted broadcast signal is supplied to an antenna 27 and then transmitted to a plurality of reception stations 10C.

The broadcast signal received by an antenna 29 of the reception station 10C is supplied to a receiver 30 in which the transmission code inserted into the broadcast signal is decoded. The service data resulting from the decoding is supplied to a personal computer 31 and thereby a necessary information is selected. This necessary information is supplied to a monitor 32 in which the data thereof is monitored.

Let it be assumed that as the transmission signal to be inserted into the broadcast signal, there are employed 8 horizontal lines (8 channels) at maximum. Then, in the data base station 10A, there can be located a plurality of data bases, for example, 8 data bases 11A to 11H in accordance with the above mentioned number of channels.

The data bases 11A to 11H are respectively provided with large-scaled host computers 12A to 12H and billing computers 13A to 13H corresponding to the respective data bases. Each of the host computers 12A to 12H is used to collect the stock information, the commodity exchange information and the like at every area and to form the service information data (hereinafter referred to as service data) which is to be supplied to the users.

While, each of the billing computers 13A to 13H is used to manage the reception contract state of the subscriber who is entitled to receive the service data in each data base to thereby form a billing data corresponding to the reception contract or the cancellation of the contract, that is, an addressing data at every reception contract period.

The service data and the billing data are respectively supplied to corresponding processors (front end processors FEP) 14A to 14H by utilizing a telephone network line and a special network line. One processor can process the data of one channel and the data channel of one channel corresponds to one horizontal line inserted into the video signal.

Each of the processors 14A to 14H is provided with data input ports of 8 systems by which the service levels of 8 kinds can be multiplexed with one channel at maximum. Accodingly, as shown in FIG. 1, the service data transmitted from the first data base 11A can be inputted to any of the processors 14A to 14H. This is also true for the service data of the second to eighth data bases 11B to 11H. Thus, 8 processors 14A to 14H can process service data of 64 kinds at maximum.

To the processors 14A to 14H, there is connected a host computer 15 which generates a control data and the like which will be described later. A transmitting signal which is shuffled on the basis of these data is generated from each of the processors 14A to 14H.

The transmission data is supplied to a data inserting circuit 17 in which it is superposed on a video signal supplied thereto from a terminal 18. Which horizontal line in the vertical blanking period of the video signal the transmission signal is inserted is determined by a control signal (not shown) supplied thereto.

The broadcast signal inserted with the transmission signal is supplied to a transmitter 20 in which it is converted to the signal of the SHF band and then transmitted through a BS antenna 21 to the broadcast satellite 22.

FIG. 2 shows an example of a format (one horizontal line amount) of the transmission signal to be superposed on the broadcast signal. This transmission signal is formed of
(1) service data portion SD (21 bytes in this example);
(2) check bit portion CB (10 bytes) for the service data portion SD;
(3) control data portion CD (one byte) inserted to the front portion of the service data portion SD;
(4) synchronizing data portion formed of a bit synchronizing code BIS (2 bytes) and a byte synchronizing code BYS (one byte) and inserted into the front portion of the control data portion CD; and
(5) channel address portion CA (one byte) inserted between the synchronizing data portion and the control data portion CD.

The synchronizing data portion is the clock data inserted to decode the transmission signal.

The channel address portion CA is the data indicative of the kinds of the occupied channel.

The control data portion CD is the data which indicates the shuffling block data and a shuffling map data of the shuffled service data portion SD and so on. This control data CD is transmitted also under the shuffled state.

The service data portion SD is the data such as a stock information and the like suitable for the service of users.

FIG. 3 is a diagram showing a format of the service data portion SD before being shuffled.

The service data portion SD is formed, in this example, such that 62 fields (62 lines) are taken as one data block and one data block is further divided into 8 service blocks (SB1 to SB8). Of one data block, 31 bytes of data are inserted into one horizontal line and one service block is formed of 31 bits.

The data inserted to the first field before being shuffled are the header data portion HD and the data inserted to the second field and the followings are the service data SDA.

The header data portion HD is used as the decoding information data (superimposed informations of service data and so on) to decode the service data SDA which is inserted into the second field and the followings.

FIG. 4 is a data format showing a relationship between the service data portion SD and the following service data SDA.

That is, at the first horizontal line corresponding to the first field, there is located a header portion HD having the format shown in FIG. 4 at every service block. The header portion HD has the format which is formed of:
(1) service level portion SL (3 bits)
This is a data indicative of the channel through which the service data is inserted.
(2) baud rate portion BR (2 bits)
This portion is used because the arrangement of the service block upon transmission becomes different dependent on the baud rate. The details thereof will be described later.
(3) sync/async portion SAS (one bit)
This is a data indicative of the fact that the data is transmitted through a sync. (synchronizing) mode or async. (asynchronous) mode.
(4) key code portion KC (4bits)
This is a key code inserted into each service data of the appointed month in order that only a reception contractor who pays the charge can receive the data service. When the data is compared with the key code transmitted to each decoder by the addressing, if they are coincident, the service of data becomes available.
(5) line data end portion LDE (6 bits)
Since the length of block forming one service block is different at every service block, this data is used to indicate the number of lines constituting the block.

In the case of FIG. 4, the service block is ended at the 58th line so that in this case, a data indicating that the 58th line is the last line is inserted as the line data end portion LDE.
(6) bit data end portion BDE (5 bits)
This data indicates the bit number of the service block at its last line. In the example shown in FIG. 4, 10th bit is the last bit so that this last bit is expressed by the bit data end portion BDE.

The header data portion HD having such format is assigned to the first horizontal line of each service block after the data is shuffled.

Depending on the baud rate portion BR, the arrangement of the service block SB upon transmission becomes different.

For example, when the transmission capacity is 9600 bauds at maximum, if the transmission rate of 9600 bauds is set, as shown in FIG. 5A, the data formed of first to eighth service blocks SB1 to SB8 becomes only one channel. While, if the transmission rate is set as 4800 bauds, two channel data can be transmitted as shown in FIG. 5B. FIGS. 5C and 5D respectively illustrate examples of other baud rates. In addition, 2400 bauds and 1200 bauds can be selected so that it will easily be understood that other combinations than the illustrated examples can be adopted.

The above mentioned header data portion HD, the service data SDA and the check bit portion CB are shuffled within every line and among 62 lines.

However, the processors 14A to 14H carry out such a processing that even after being shuffled, in the service data portion SD inserted into the first horizontal line of one block data, the data portion HD is positioned as mentioned above.

Figure 7:
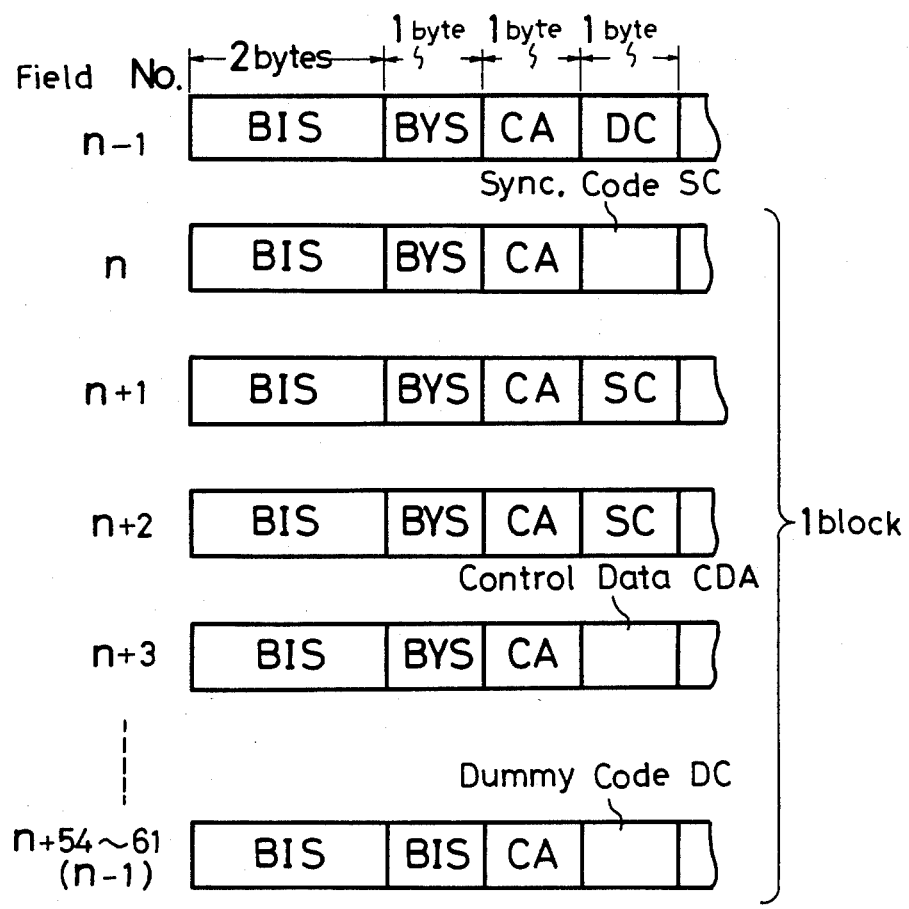
FIG. 7 is a diagram showing a relationship between a synchronizing code and a control data.
Figure 8:
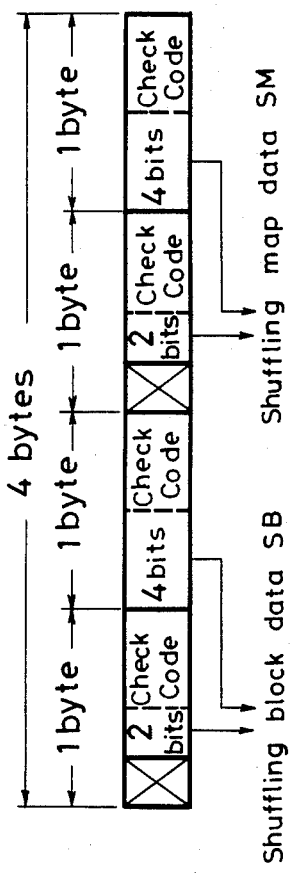
FIG. 8 is a schematic representation showing one example of a format of a control data.

FIGS. 6 to 8 are diagrams used to explain the content of the control data CD.

The control data CD is also shuffled except its one part of data. An example of an arrangement of the deshuffled data corresponding to one block is shown in FIG. 6.

In the control data portion CD, the data arrangement thereof can be varied and is formed of
(1) synchronizing code SC (one byte)

(2) control data CDA (formed of 48 bytes and the data length thereof is fixed)
(3) dummy code DC (formed of 4 to 11 bytes and the code length thereof can be varied).

The synchronizing code SC is used as a data information for deshuffling the shuffled control data portion CD and as a data information indicative of the end of the control data portion CD. When 64 kinds of synchronizing codes are used as the synchronizing code, the control data portion CD can select 64 kinds of shuffling patterns.

The synchronizing code SC is not shuffled. The synchronizing code is regarded as the synchronizing code SC by inserting the same code three times successively. That is, as shown in FIG. 7, this synchronizing code SC is inserted into the first to third lines.

The data of 48 bytes next to the synchronizing code SC becomes the control data CDA.

The control data CDA contains shuffling block information of the service data portion SD transmitted to a decoder 50 (see FIG. 12) and a shuffling map information thereof.

FIG. 8 shows an example of a format of the control data CDA (before being shuffled).

The control data CDA is formed of 4 bytes as a fundamental unit, in which the front 2 bytes are assigned to a shuffling block data SB and the rear 2 bytes are assigned to a shuffling map data SM.

The shuffling block data SB has a total of 6 bits formed of 2 bits in the first byte and 4 bits in the second byte. A check code CC inserted into each byte is used to check the data of the shuffling block data SB inserted into each byte.

The shuffling map data SM has a total of 6 bits formed 2 bits in the third byte and 4 bits in the fourth byte. As check code CC inserted into each byte is used to check the data of the shuffling map data SM inserted into each byte.

The same code as the control data CDA is inserted five times (totally 20 bytes) and accordingly, the format before being shuffled becomes as shown in FIG. 6.

The reason that the same data is used five times successively is to avoid the mis-operation caused by a noise mixed in the transmission. In this example, the five control data CDA are calculated in a majority logic fashion and the data more in number is used as the control data CDA.

The control data portion CD has a fixed data length of 48 bytes and a data successive to the above mentioned control data CDA is used as an optional data. Accordingly, the data slot after 20 bytes is not used as the control data.

The dummy code DC inserted at the rear portion of the control data CDA has a variable code length whereby the code length of the whole control data portion CD is variable. In this example, the control data portion CD can be varied over a range of 55 to 62 fields. Accordingly, the dummy code DC falls in any one of the code lengths of 4 to 11 fields. As a result, in the control data portion CD, one block is formed of 55 to 62 fields.

The dummy code DC uses a code pattern which does not exist in the synchronizing code SC. The reason for this is to separate the synchronizing code SC from the control data portion CD accurately.

If the code length of the control data portion CD is arranged so as to be variable, it becomes difficult to detect the control data portion CD inserted into one block. Thus, the deshuffling processing done by those who are not the subscribers becomes complicated so that the secrecy of data is increased.

Although the synchronizing code SC, which is not shuffled, is contained in the control data portion CD, even when the synchronizing code SC is not shuffled, the code length of the control data portion CD itself can be varied so that the control data portion CD can not be decoded easily.

However, in the decoder used by the entitled subscriber, there exists a map of deshuffling pattern to detect the synchronizing code SC and to deshuffle the control data portion CD. Accordingly, the control data portion CD can be precisely deshuffled by such decoder.

In this case, since the data length (48 bytes) succeeding to the synchronizing code SC is constant and hence it is relatively easy to detect this synchronizing code SC at the decoder side.

As described above, the control data portion CD is shuffled in accordance with the kinds of the synchronizing code SC. Accordingly, when the shuffling map data contained in the shuffled control data CDA is decoded, the service data portion SD is deshuffled.

Then, the service data portion SD and the control data portion CD thus shuffled are inserted into one horizontal line at the unit of 31 bytes to thereby form the format of the transmission signal shown in FIG. 2. In this case, the synchronizing data (see FIG. 2) inserted into each horizontal line is not shuffled.

In order to transmit the transmission signal shown in FIG. 2, the addressing is carried out for the decoder 50 located in the receiver 30 as a preceding stage.

Similarly to the transmission signal, the addressing is carried out by using the broadcast signal. In the case, of the transmission signals shown in FIG. 2, a transmission signal in which the addressing data ADA is inserted as the service data SDA is used.

An outline of the addressing will be described first.

A plurality of decoders located in a plurality of receiving stations 10C are provided with non-volatile memories having stored therein a key code and the key code transmitted upon transmission is stored in these memories. The decoders are attached with successive addresses, whereby when an address (address map may be used occasionally) for specifying the decoder is transmitted, the standby mode for the key code is presented and the writing state of the key code is automatically controlled on the basis of whether the binary code of the address map is "1" or "0".

Let it now be assumed that when the binary code is, for example, "1", the write enable state is presented. Then, when the binary code of the address map is "1", the key code is written in the corresponding decoder. Accordingly, in this case, when the binary code is "1", this indicates that the reception contract charge is paid by the subscriber.

When the binary code is "0", the reception contract charge is not paid so that in that case, the key code is not stored in the corresponding decoder. The addressing is executed out at every reception contract period and the execution period uses a predetermined period before the reception contract period (may be encroached on the reception contract period of the next month).

Since the key code KC of the appointed month is inserted into the transmission signal as shown in FIG. 2, only when this key code KC and the key code stored in the decoder coincide with each other, the subscriber can receive the data service.

Figure 9:
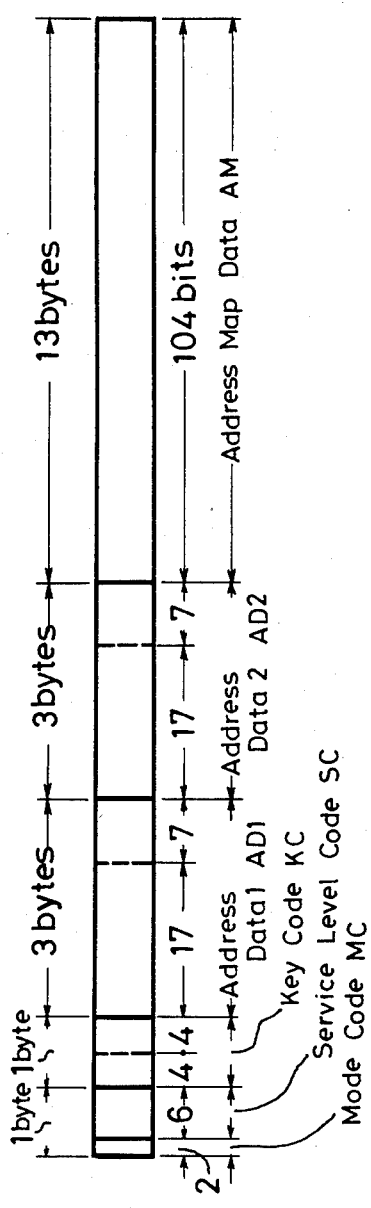
FIG. 9 is a schematic representation showing one example of a format of an addressing data.

To this end, the addressing data AD employs a format shown in FIG. 9.

Also in the addressing data AD, one block is formed of 62 fields and they are shuffled in order to maintain the secrecy of data. The format shown in FIG. 9 indicates the address data AD of one horizontal line before being shuffled.

The addressing data AD is constructed as follows.

(1) key code KC (one byte)

There are transmitted two kinds of key codes. Each of the key codes is formed of 4 bits. One key code is the key code for the appointed month, while the remaining key code is the key code for the next month.

When the decoder receives the service data SDA, if one of these two key codes is stored, the service mode is presented.

(2) address data AD1 and AD2 (each formed of 3 bytes)

They are address data used to specify the decoder. Although they will become different based on the mode code of the addressing operation which will be described later, the addresses of up to 100 decoders can be specified by the data from the address data AD1 to AD2.

However, the address of each decoder can not be specified by the address data.

(3) address map data AM (13 bytes)

The addresses of 104 decoders in which the address of the address data AD1 (AD2) is taken as a base point are specified.

The addresses of the respective decoders are sequentially specified in such a manner that the first one bit of the address map becomes an address of the decoder same as the address data AD1 (AD2) and that the next one bit becomes the address for the next decoder.

The address data AD1 and AD2 and the address map data AM are specified in addressing in the different manners by using a mode code MD which will be mentioned next.

(4) mode code MD (2 bits)

This code is used to specify the mode upon addressing.

Since this code is formed of 2 bits, it is possible to select the addressing mode of the following 4 kinds.

(a) mode 0

This mode is a general address mode under which all the decoders having the addresses specified by the address data AD1 and AD2 do not receive the data service.

In this case, the bits of the address map data AM are all set to "0" and the key code KC transmitted is not stored in the memory of the decoder.

(b) mode 1

This is the mode in which the data service is supplied to the decoder specified by the address of the address data AD1 and the decoder specified by the address of the address data AD2 (accordingly, only two decoders are specified).

(c) mode 2

This mode is such one that the addressing is executed for each of the 104 decoders in which the address data AD1 and AD2 are taken as a base point on the basis of the binary code "1" or "0" of the address map AM succeeding to the address data AD1 and AD2.

In this case, the address data AD1 and AD2 are the same address data.

When the 100th order of a decoder is specified by the address data AD1, the first bit of the address map AM specifies the 100th decoder and the succeeding bit specifies the 101st decoder.

When the bit is "1", the above mentioned key codes (two kinds) are stored in the memory of the corresponding decoder.

While, when the bit is "0", the key code is not stored therein.

(d) mode 3

Contrary to the mode 0, the addressing is executed for all of the decoders specified by the address data AD1 and AD2.

Accordingly, the key codes are stored in those decoders. In this case, the address map data AM is set as all "1".

(5) service level code SL (6 bits)

This code indicates the fact that a data of a specified host computer is inserted into a specified channel and then is transmitted. The more significant 3 bits are assigned to a data channel, while the less significant 3 bits are assigned to a service level, respectively.

In the above mentioned example, since the data is transmitted by using 8 host computers and 8 horizontal lines (8 channels), totally 64 kinds of service levels can be specified.

In the above mentioned addressing format, the reason that the two kinds of the key codes KC are transmitted simultaneously is as follows.

Taking the reception contract period as a unit, the addressing is executed before the contract period is ended. For example, when the contract period is determined at the unit of a month, the addressing of the next month is executed in this month. Since the key code (contained in the transmission signal) transmitted during the contract period is a key code having a pattern different from that of the preceding key code, if only the key code (one kind) of the next month is transmitted upon addressing, there will arise the following defects.

Figure 10:
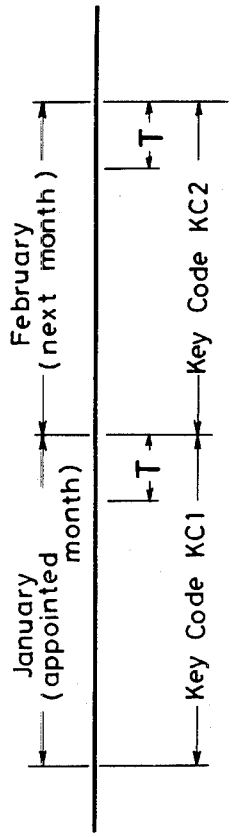
FIG. 10 is a diagram used to explain the synchronizing code.

As, for example, shown in FIG. 10, let it be assumed that the appointed month is January, a code KC1 is used as the key code of January and a code KC2 is used as the key code of February.

In this case, during a period T in the latter half of January, the addressing is executed by the key code KC2. When the reception contract charges for January and February are paid by the subscriber, upon addressing by the mode 2, the specified decoder stores the key code KC2 in its predetermined memory.

By this memory operation, instead of the key code KC1 of January, the key code KC2 is stored in this memory.

Accordingly, the key code is changed to the key code KC2 from the latter half period of January so that although the reception contract charge is already paid, the data service can not be afforded during the latter half period after the addressing.

When upon the above-mentioned addressing the key codes KC1 and KC2 of the appointed month and the next month are transmitted simultaneously and the addressings are executed simultaneously, the key codes KC1 and KC2 are both stored in the memory so that even after the addressing, the data service of the appointed month can be executed. Thus, the above mentioned disadvantage can be removed.

The reason that the plurality of addressing modes can be selected will be described below.

For example, when the receiving station 10C having all decoders with addresses from NO. 0 to NO. 1000 does not pay the reception contract charge, if the addressings are not each executed at the mode 2 but the total addressing is executed at the mode 0, it is possible to reduce the time required by the addressing operation considerably.

Because of similar reason, when the reception contract charges of some receiving station 10C are paid by the users, if the addressing operation is executed at the mode 3, this addressing becomes also the total addressing so that it is possible to reduce the addressing time considerably.

However, when the payments of the reception contract charges are different on the respective addresses, if the addressing in the mode 2 is selected, it is possible to execute the addressings corresponding to the respective receiving stations 10C.

Further, when the addressing operation is executed for a particular receiving station of the plurality of receiving stations 10C, the addressing operation must be executed at the mode 2. If, however, the mode 1 can be selected as described above, only a particular receiving station can be addressed immediately so that as compared with the case in which the mode 2 is selected, it is possible to select the addressing time.

As set forth above, if the addressing mode is selected in accordance with the situation of the reception contract, when there are a large number of subscribers, the time required to execute the addressing for all subscribers can be reduced.

Figure 11:
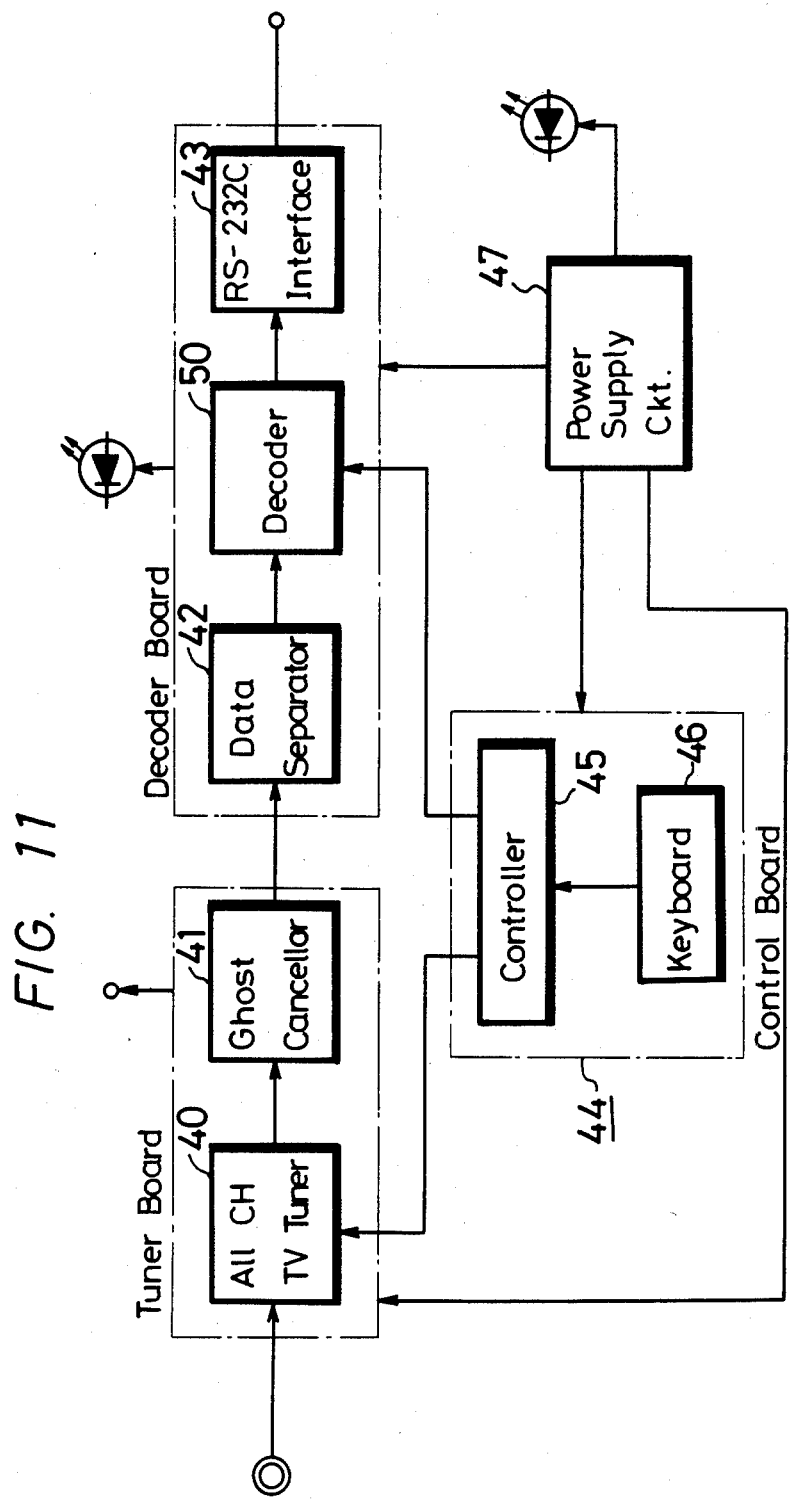
FIG. 11 is a systematic block diagram showing a main portion of one example of a receiver.

FIG. 11 illustrates an example of the receiver 30 (see FIG. 1) provided in the receiving station 10C which receives a transmission signal having the above mentioned format so as to enjoy the particular data service.

The broadcast signal received by the antenna 29 (see FIG. 1) is supplied to an all channel tuner 40 and thereby converted to a television signal having a predetermined frequency. This television signal is supplied to a ghost canceller 41 in which it undergoes the ghost cancelling processing to thereby avoid a mis-operation when a data is extracted.

The output signal from the ghost canceller 41 is supplied to a data separating circuit 42 and thereby the transmission signal inserted to the broadcast signal is extracted and then separated. The transmission signal thus extracted and separated is supplied to a decoder 50 in which a decoding processing of the service data SDA and the like are carried out. The service data SDA is converted to a data having a code conforming to the standard of the personal computer 31 (see FIG. 1) and supplied through an interface 43 to the personal computer 31.

Reference numeral 44 designates a control system which is formed of a controller 45 and a keyboard 46 which issues a command to the controller 45. Reference numeral 47 designates a power supply apparatus.

Figure 12A:
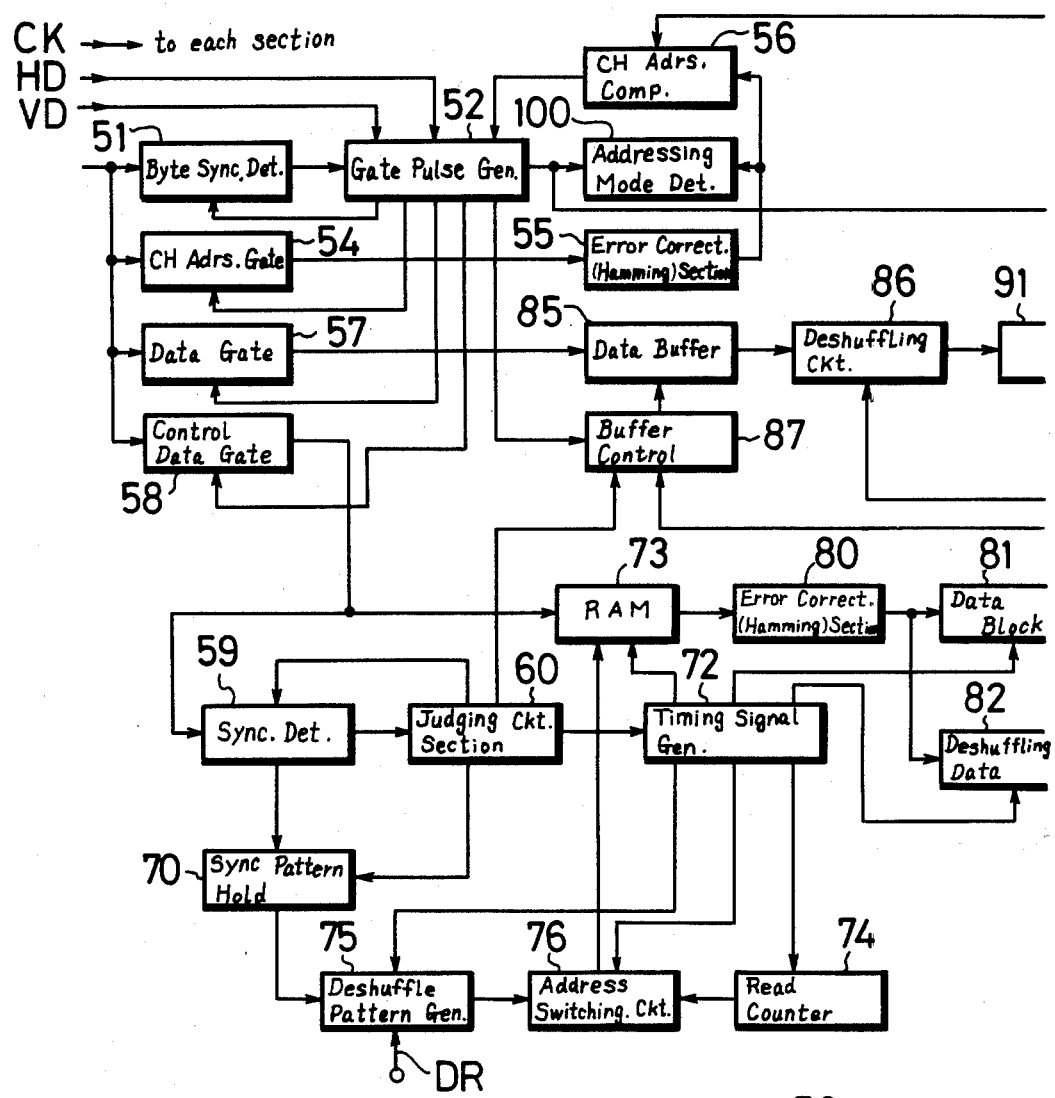
FIG. 12 (formed of FIGS. 12A and 12B) is a systematic block diagram showing one example of a decoder.
Figure 12B:
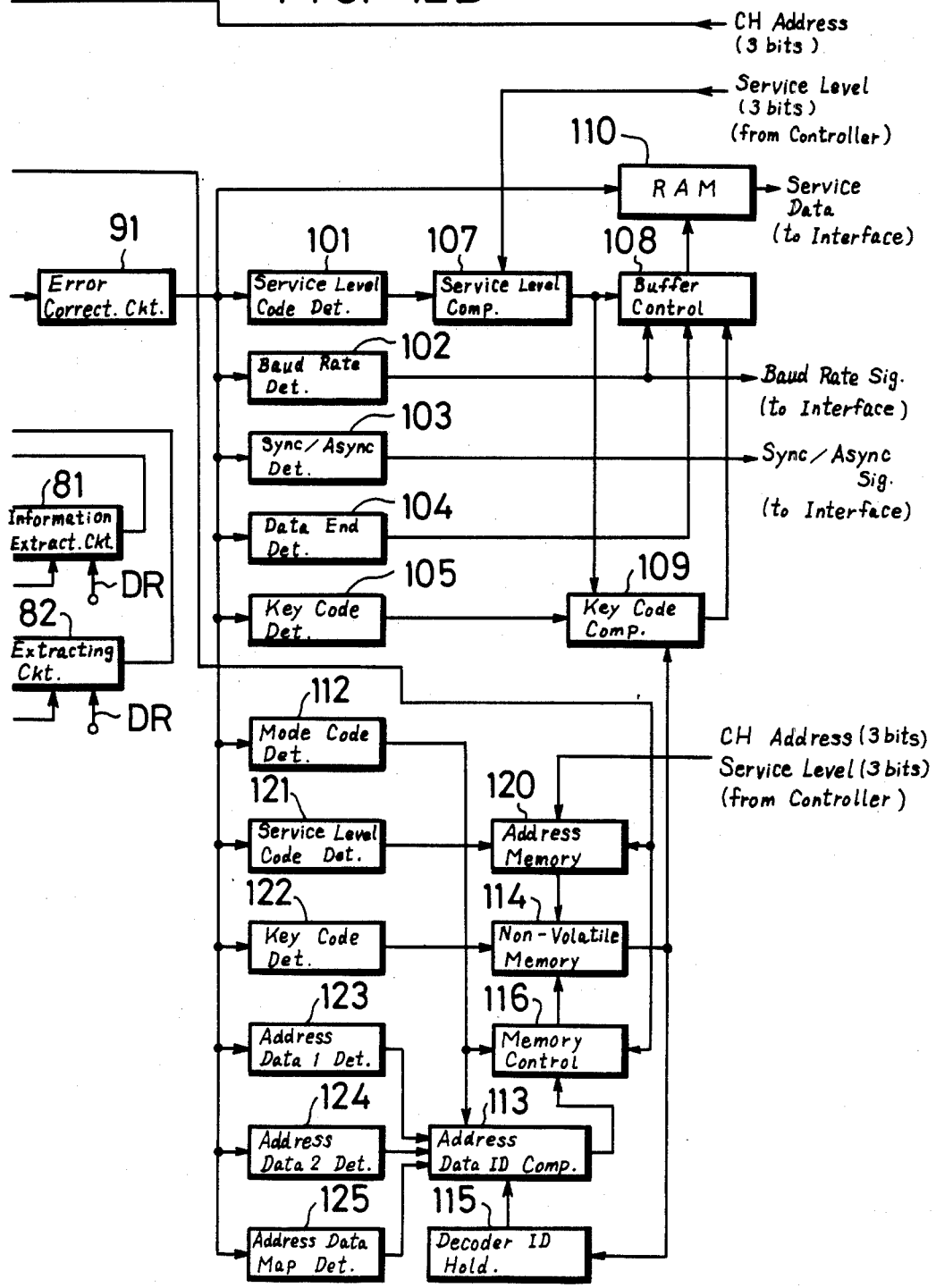

FIG. 12 (formed of FIGS. 12A and 12B) shows an example of the above mentioned decoder 50. The transmission signal separated by the data separating section 42 is supplied to a byte synchronizing section 51 in which the byte synchronizing code BYS is extracted.

The byte synchronizing code BYS is detected such that a gating signal is formed beforehand from the horizontal and vertical synchronizing signals HD and VD and the clock signal CK by a gate pulse generating section 52 and the nearby portion of the byte synchronizing code BYS is gated by this gating signal in the byte synchronizing section 51 and then detected.

When the byte synchronizing code BYS is detected, the detected signal is supplied to the gate pulse generating section 52 which generates a gating signal to extract the channel address CA, the control data portion CD, service data portion SD, the addressing data AD and the like on the basis of the byte synchronizing code BYS.

The channel address data CA extracted by a channel address gate section 54 is supplied to an error correction (hamming) section 55 and thereby corrected in error.

The channel address data CA of 4 bits thus error-corrected is supplied to and compared with a 4-bit data for setting the channel address derived from the controller 45 by a channel address comparing section 56. When they are coincident, a coincidence signal is supplied therefrom to the gate pulse generating section 52.

On the basis of this coincidence signal, the gate pulse generating section 52 generates a gate signal at a timing at which a channel address data of the same line of the next field is inserted. Similarly, it generates the gating pulses for a data gate 57 and a control data gate 58.

The control data portion CD extracted by the control data gate 58 is supplied to a synchronizing code detecting section 59 so as to detect the synchronizing code SC contained in the control data portion CD and from the synchronizing code detecting section 59, there are extracted 64 kinds of the synchronizing code SC.

When the same synchronizing code SC is detected over 3 field periods, this synchronizing code is supplied to a judging circuit section 60 as the synchronizing code SC. When receiving this detected signal, the judging circuit section 60 supplies a holding signal to a synchronizing pattern holding section 70 in order to hold the synchronizing code SC.

Further, a gating signal for detecting a synchronizing code of the next control data portion CD is supplied from the judging circuit section 60 to the synchronizing code detecting section 59. Thus, the synchronizing code SC is detected easily and the details thereof will be described later.

When the synchronizing code SC is detected, the judging circuit section 60 supplies to a timing signal generating section 72 a synchronizing detecting signal by which when the control data CDA itself next to the synchronizing code SC is written in a RAM (random access memory) 73, the deshuffling is simultaneously executed on the basis of the kinds of the synchronizing code SC.

A deshuffling pattern generating section 75 receives a pattern code (6 bits) from the synchronizing pattern holding section 70 and then generates a deshuffling pattern which becomes a write address for the RAM 73. The start signal therefor is generated from the timing signal generating section 72.

When the control data CDA is read out from the RAM 73, the control data CDA is deshuffled.

When the control data CDA is read out from the RAM 73, a read counter 74 is operated by a count start signal derived from the timing signal generating section 72 and at the same time an address switching section 76 is switched to the reading side by an address switching signal from the section 72 whereby the read signal is supplied to the RAM 73.

The control data CDA read is error-corrected by an error correction (hamming code) section 80. Further, by the holding signals formed from the timing signal generating section 72, the data block information BS is extracted from a data block information extracting section 81 and the deshuffling map data SM is extracted from a deshuffling data extracting section 82. They are used as key signals to reproduce the data portion.

The service data SDA (or addressing data ADA) passed through the data gate 57 is stored in a data buffer 85 and then supplied to a deshuffling circuit 86 which process is controlled by a buffer control section 87.

The buffer control section 87 receives a reference signal indicative of the position (field) of the synchronizing code contained in the control data CDA from the judging circuit section 60 and a data block displacement information from the data block information section 81, and carries out such a control that the service data SDA (or the addressing data ADA) is stored in the data buffer 85 at every one block unit and then deliver the same therefrom to the circuit 86.

The deshuffling circuit 86 receives the deshuffling pattern information SM from the deshuffling data section 82 and deshuffles the service data. Thereafter, the service data SDA (or the addressing data ADA) is error-corrected by an error correction circuit 91.

When a data transmission trouble occurs, a data reset signal DR is supplied from the gate pulse generating section 52 to the buffer control section 87, whereby a data stored within one block until the data transmission trouble occurs is cleared. Similarly, this data reset signal DR is also supplied to the control data processing system and thereby the data is cleared.

Specifically, the above mentioned data reset signal DR is supplied to the deshuffling pattern generating section 75, the data block information extracting section 81 and the deshuffling information extracting section 82, respectively.

On the other hand, a capacity of a RAM 110 used to store the data is selected such that it can store the data of transmission capacity (9900 bauds) larger than a normal transmission rate (9600 bauds). Accordingly, even when the above mentioned transmission trouble occurs, the data can be continuously transmitted to the succeeding interface 43 without intermission. This processing mode is called as a catch-up mode.

When the service mode is detected by an addressing mode detecting circuit 100, in order to read a data at the header portion HD of the first line of the service data portion SD (one data block) error-corrected, a service level code detecting section 101, a baud rate detecting section 102, a sync./async. detecting section 103, a data end detecting section 104 and a key code detecting section 105 are respectively operated to thereby detect the respective data.

The service level code SL detected is compared with a service level code derived from the controller 45 by a service level comparing section 107. When they are coincident, a coincidence signal is supplied therefrom to a buffer control section 108 and a key code comparing section 109.

The key code detected by the section 105 is compared with a predetermined key code stored upon addressing by the key code comparing section 109. When they are coincident, a coincidence signal is supplied therefrom to the buffer control section 108.

On the basis of the service level coincidence signal, the key code coincidence signal, the baud rate data and the data end information, the buffer control section 108 carries out such a control that a necessary data is buffered to the RAM 110 and then delivered to the interface 43 at the constant rate.

The baud rate signal and the sync./async. signal are also supplied to the interface 43.

In the case of the addressing mode, each line of the data block becomes an addressing data.

For this reason, the mode signal MC, the service level code SL, the key code KC, the address data AD1 and AD2 and the address data map AM are detected respectively at every line.

To this end, in addition to a mode detecting section 112, there are provided a service level code detecting section 121, a detecting section 122 for the key code KC, a detecting section 123 for the address data AD1, a detecting section 124 for the address data AD2 and a detecting section 125 for the address data map AM, respectively.

The mode code MC detected by the mode code detecting section 112 is supplied to an address data ID comparing section 113. In the address data ID comparing section 113, the address data transmitted and an ID (address data) peculiar to each decoder stored in a non-volatile memory 114 are compared. The mode code becomes a code used to process the address data AD1, AD2 and the address data map AM in accordance with the format before the above comparison.

When the coincidence relative to the output from a decoder ID holding section 115 is detected, an ID coincidence signal is supplied from the section 115 to a memory control section 116 and the memory control section 116 controls the non-volatile memory 114 to store the key codes (two kinds) at that time therein. In this case, the address of the non-volatile memory 114 is a 6-bit data of the service level code (formed of 3 bits of the channel address and 3 bits of the service level).

An address selector 120 is adapted to select the service level code SL transmitted upon addressing mode, while it is adapted to select a channel address data CA and a service level setting value derived from the controller 45 upon service mode.

In the service mode, the channel address thus set and the key codes stored in the service level are read out from the non-volatile memory 114 and then fed to the key code comparing section 109.

Figure 13:
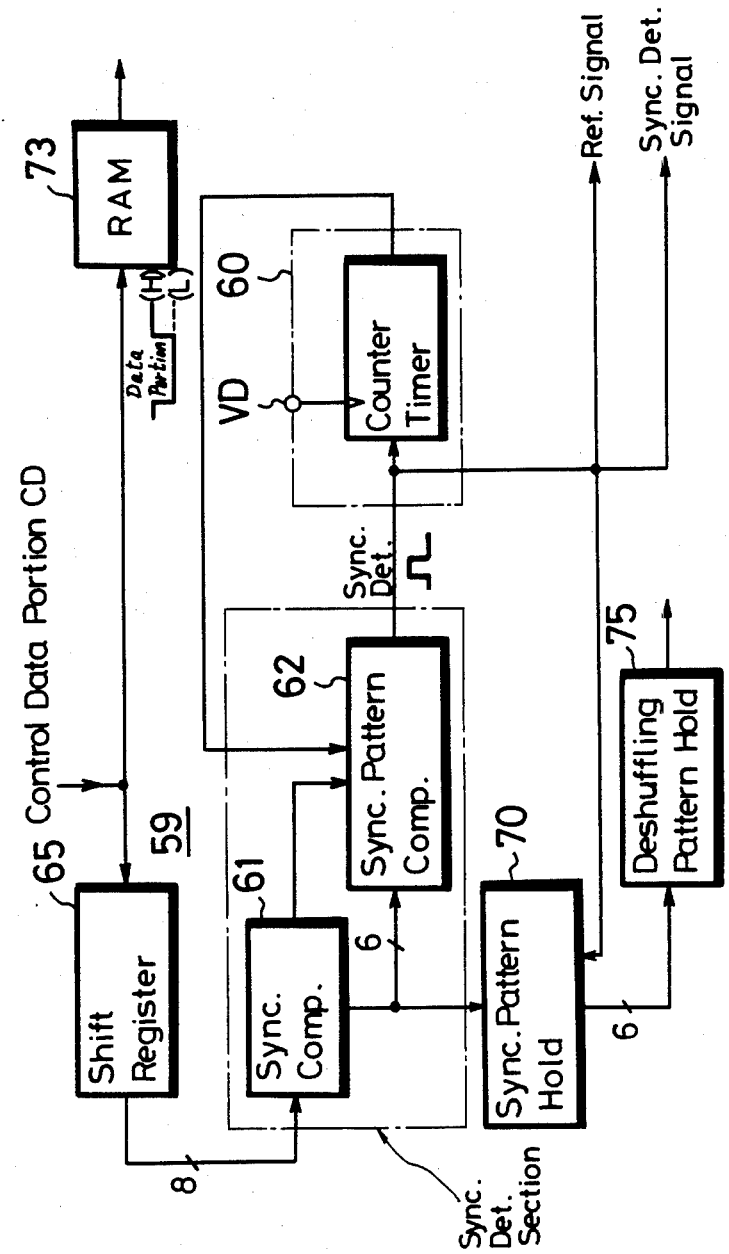
FIG. 13 is a systematic block diagram showing practical examples of a synchronizing code detecting section and a judging circuit section.

FIG. 13 is a block diagram showing a relationship between the synchronizing code detecting section 59 and the judging circuit 60. The synchronizing code detecting section 59 is formed of a synchronizing comparing section 61 and a synchronizing pattern comparing section 62. Each data of the control data portion CD gated by the control data gating section 58 is converted to an 8-bit parallel data by a shift register 65 and then supplied to the synchronizing comparing section 61 which compares the pattern data to determine which pattern of 64 kinds of synchronizing patterns the pattern of the synchronizing code SC may coincide with.

When the pattern of the synchronizing code coincides with any one of 64 kinds of patterns, the coincidence signal from this synchronizing comparing section 61 is supplied to the synchronizing pattern comparing section 62. The synchronizing code SC itself is also supplied to the synchronizing pattern comparing section 62 which checks whether or not the same synchronizing pattern and the coincidence signal are inputted three times continuously.

When the same synchronizing pattern is supplied over 3 field periods continuously, a synchronizing detected signal is generated from this synchronizing pattern comparing section 62.

The synchronizing detected signal is supplied to the judging circuit section 60. This judging circuit section 60 is formed of a counter timer and is supplied with the vertical synchronizing pulse VD as a clock signal. The synchronizing detected signal is used as a start signal for the counter timer and the count operation of the counter timer is started by the synchronizing detected signal.

When the counter timer counts 48 vertical synchronizing pulses VD, it generates a gating signal having a level "H" (high level). Thus, the last field of the control data CDA of 48 bytes successive to the synchronizing code SC is detected.

As described above, this judging circuit 60 generates the gating signal having a level "L" (low level) in the control data CDA of 48 bytes having the fixed code length of the control data portion CD and "H" in the dummy code DC with a variable length and the succeeding synchronizing code SC of 3 bytes.

The gating signal is supplied to the synchronizing pattern comparing section 62 as a masking signal so that the pattern comparing operation is inhibited during a period in which the gating signal is "L", while the pattern comparing operation is executed only during the period in which the gating signal is "H".

Since the synchronizing code SC and the coincidence signal are supplied to the synchronizing pattern comparing section 62 at any timing at which the gating signal becomes "H" level, even if the code length of the dummy code DC is variable, it is possible to detect the synchronizing code SC successive to this dummy code DC.

When the synchronizing code detecting section 59 and the judging circuit 60 are constructed as described above, even if the code length of the control data portion CD is variable, it is possible to positively detect the synchronizing code SC inserted into the control data portion CD.

Although there is a possibility that the control data CDA will contain a code pattern the same as that of the synchronizing code SC, the dummy code DC inputted during a period in which the pattern comparing operation is executed does not contain a code pattern the same as that of the synchronizing code SC so that in association with the above mentioned construction, the detection accuracy of the synchronizing code SC can be increased.

The holding signal supplied to the synchronizing pattern holding section 70, the synchronizing detected signal supplied to the timing signal generating section 72 and the reference signal supplied to the buffer control section 87 are generated at the same timing same as that of the synchronizing detected signal.

According to the novel information service system of the present invention as described above, since the key code KC for deshuffling the control data portion CD is inserted into a portion of the control data portion CD and the code length of the control data portion CD is made variable, if the control data portion CD is merely decoded, it is very difficult to decode the control data portion CD.

However since the deshuffling map is prepared for the subscribers those who paid the predetermined reception contract charges, the control data portion CD can be decoded easily by utilizing the synchronizing code SC.

As a result, there is a practical advantage that the information service system the secrecy of which is very high can be provided. Accordingly, this invention is very suitable for a pay channel data service system which can supply a data only to the particular subscribers.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. A data transmitter used in a data transmission system and for transmitting services data to a user terminal, comprising:
    (a) services source for generating service data in BLOCKs;
    (b) first shuffling means for shuffling said service data within one block according to a predetermined shuffling map;
    (c) control data generating means for generating control data corresponding to each block of said service data, said control data having a data portion with a variable length and representing at least said predetermined shuffling map and a synchronizing code portion;
    (d) second shuffling means for shuffling only said data portion of said control data according to a predetermined shuffling pattern that is represented by said synchronizing code portion of said control data;
    (e) mixing means for mixing said service data and said control data; and
    (f) transmitting means for transmitting the output of said mixing means.

2. A data transmitter according to claim 1, wherein said transmitting means includes a video signal source for generating a video signal having a vertical blanking interval, inserting means for inserting a portion of the output of said mixing means into said vertical blanking interval and modulating means for modulating an RF signal by the output of said inserting means.

3. A data transmitter according to claim 1, wherein said control data generating means generates the data portion of said control data with a control data portion having a fixed length and a dummy code portion having a variable length.

4. A data transmitter according to claim 3, wherein said control data generating means generates siad synchronizing code in a head portion of each block, whereby the control data of one block is separated from the control data of an adjacent block by said synchronizing code.

5. A data transmitter according to claim 1, wherein said service data includes a key code which is the same as that stored in a user terminal entitled to receive the service data.

6. A data receiver used in a data transmission system, and for receiving data transmitted from a transmitter, said data having service data shuffled according to a predetermined shuffling map and control data with a data portion of variable length and representing at least said predetermined shuffling map and a synchronizing code portion, only said data portion of said control data being shuffled according to a predetermined shuffling pattern that is represented by said synchronizing code portion of said control data, said data receiver comprising:
- (a) data separating means supplied with received data for separating said service data and said control data therefrom;
- (b) synchronizing code detecting means supplied with said separated control data for detecting said sychronizing code portion of said control data;
- (c) deshuffle pattern generating mean supplied with the output of said synchronizing code detecting means representing said predetermined shuffling pattern for generating a deshuffle pattern correspoding to said predetermined shuffling pattern;
- (d) first deshuffling means supplied with said separated control data and said deshuffle pattern for deshuffling the data portion of said control data;
- (e) deshuffling map generating means supplied with the output of said first deshuffling mean for generating a deshuffling map corresponding to said predetermined shuffling map; and
- (f) second deshuffling means supplied with said separated service data and said deshuffling map for deshuffling said service data.

* * * * *